(No Model.) 2 Sheets—Sheet 1.
D. WICKHAM.
APPARATUS FOR APPLYING BOTTLE STOPPERS OR CAPS.
No. 476,712. Patented June 7, 1892.
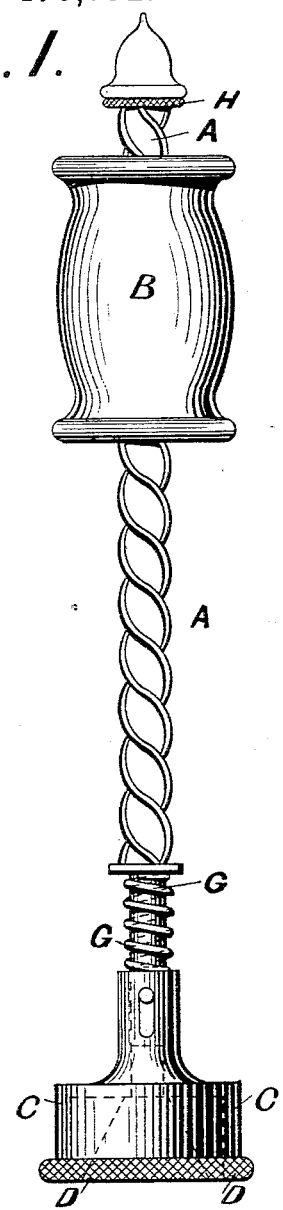
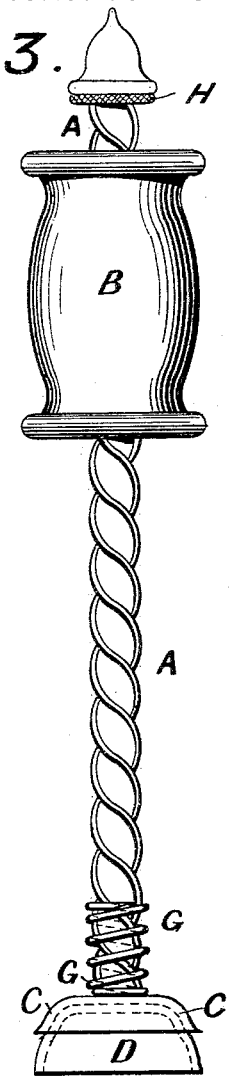
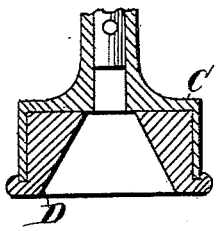

(No Model.) 2 Sheets—Sheet 2.
D. WICKHAM.
APPARATUS FOR APPLYING BOTTLE STOPPERS OR CAPS.
No. 476,712. Patented June 7, 1892.
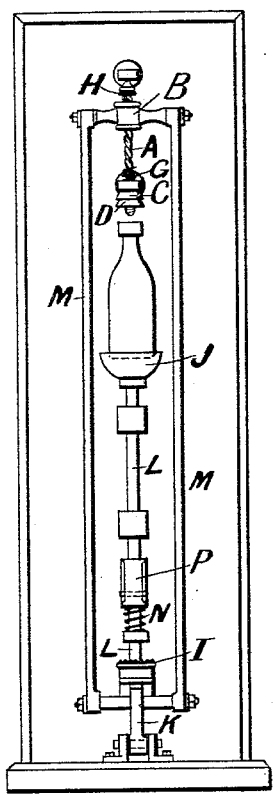
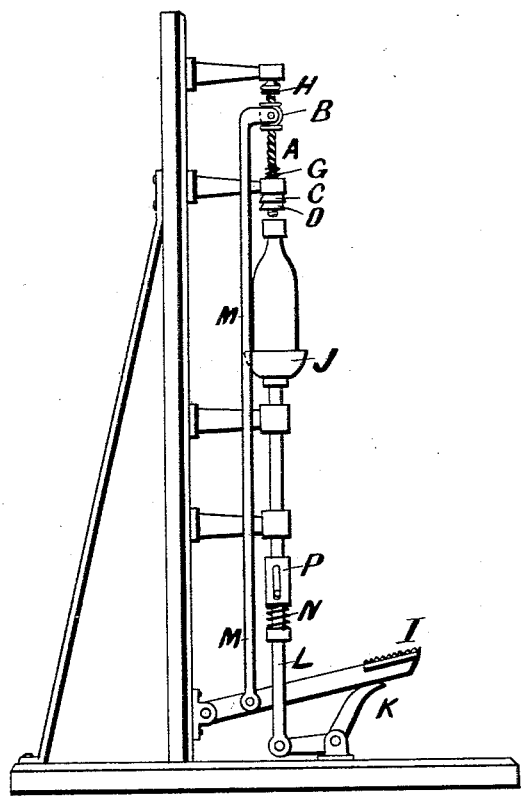
Witnesses:
J. A. Rutherford
J. H. Daly
Inventor:
Dennis Wickham,
By James L. Norris.
Attorney.
THE NORRIS PETERS CO., PHOTO-LITHO., WASHINGTON, D. C.

UNITED STATES PATENT OFFICE.

DENNIS WICKHAM, OF WARE, ENGLAND.

APPARATUS FOR APPLYING BOTTLE STOPPERS OR CAPS.

SPECIFICATION forming part of Letters Patent No. 476,712, dated June 7, 1892.

Application filed July 7, 1891. Serial No. 398,694. (No model.) Patented in England November 1, 1889, No. 17,330.

*To all whom it may concern:*

Be it known that I, DENNIS WICKHAM, a subject of the Queen of Great Britain, residing at the Star Brewery, Ware, in the county of Hertford, England, have invented new and useful Improvements in Apparatus for Applying Bottle Stoppers or Caps and the Like Having Internal or External Screw-Threads, (for which I have obtained a patent in Great Britain, No. 17,330, bearing date November 1, 1889,) of which the following is a specification.

The object of my invention is an appliance for imparting a twisting or screwing action to bottle stoppers or caps of the "screw" kind after they have been placed or dropped loosely into or onto the mouths or necks of bottles, jars, or other similar vessels for closing them.

For the purpose of my invention I employ a twisted or worm shaft with a handle for working same, and at one end of the twisted or worm shaft I affix a cup or other shaped nipping device for taking over and temporarily holding the stopper when placed in position in the bottle, when by a push or pull down motion of the handle on the spindle the cup or nipping device will be caused to revolve and twist or screw the stopper tightly home. I fit a spring to serve as a cushion between the cup or nipping device to soften the blow when the handle is pushed down sharply, and a washer may be placed at the upper end of the spindle as a buffer for the return of the handle.

My invention will be clearly understood by reference to the annexed drawings.

Figure 1 is an elevation of an apparatus hereinbefore set forth. Fig. 2 is a central vertical section of the socket for the reception of the head of a screw-stopper; Fig. 3, an elevation of apparatus with socket provided with suction device for holding head of screw-stopper; Fig. 4, a front elevation of machine with the before-mentioned screw-stoppering device in position for working by foot-pedal; Fig. 5, a side elevation of machine shown at Fig. 4.

A is an Archimedean screw-spindle.

B is a handle to travel down and cause the rotation of the screw-spindle.

C is a socket for reception of head of screw-stopper.

D, Figs. 1 and 3, is a ring-shaped cushion in socket C for round-headed screw-stoppers.

D' represents a cushion for engaging the heads of large stoppers, which may be formed integral with the cushion D or separately therefrom, as shown in Fig. 2.

G is a spiral spring at bottom end of spindle to reduce concussion when handle is depressed too suddenly.

H is a spring-cushion at top of spindle to check upthrust of handle.

According to Figs. 1 and 3 the handle is operated by the hand, the screw stopper being first placed on the bottle-neck; but according to Figs. 4 and 5 the handle is operated by the pedal or foot-lever I. In this arrangement a stopper is placed in the socket and a bottle on the cup J. The foot-lever is then depressed, and by a bell-crank K the stem L lifts the bottle up to the stopper, which is simultaneously being rotated by the pull-down action of the handle B by the rod M, which is actuated by the foot-lever I, the spring N and sleeve P permitting the lower end of the stem L to rise without affecting the position of the bottle.

What I claim, and desire to secure by Letters Patent, is—

1. The combination, with a twisted or worm shaft A, having a handle B and a socket C, of a rubber cushion D in said socket for engaging the head of a stopper, and a spiral spring G on said twisted or worm shaft in proximity to the socket C, substantially as described.

2. The combination, with a twisted or worm shaft A, having a handle B and a socket C, of a rubber cushion D in said socket, a rubber cushion D', and a spring G on the twisted or worm shaft in proximity to the socket C, substantially as described.

In witness whereof I have hereto signed my name, in the presence of two subscribing witnesses, the 17th day of April, 1891.

DENNIS WICKHAM.

Witnesses:
 CLAUD LORAINE,
  *Great Cozens, Ware, Herts.*
 WILLIAM WICKHAN,
  *Star Brewery, Ware, Herts.*